US011836990B2

(12) United States Patent
Omar et al.

(10) Patent No.: US 11,836,990 B2
(45) Date of Patent: Dec. 5, 2023

(54) METHODS AND SYSTEMS FOR TWO-PHASE CAMERA TO LIDAR ALIGNMENT

(71) Applicant: GM GLOBAL TECHNOLOGY OPERATIONS LLC, Detroit, MI (US)

(72) Inventors: Yousef Omar, Troy, MI (US); Mark Wolski, Warren, MI (US); Hao Yu, Troy, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 17/655,531

(22) Filed: Mar. 18, 2022

(65) Prior Publication Data

US 2023/0298355 A1  Sep. 21, 2023

(51) Int. Cl.
*G06V 20/58* (2022.01)
*G06T 7/13* (2017.01)
*G06T 7/55* (2017.01)
*B60W 40/10* (2012.01)
*B60W 40/12* (2012.01)
*G06T 7/30* (2017.01)

(52) U.S. Cl.
CPC .............. *G06V 20/58* (2022.01); *B60W 40/10* (2013.01); *B60W 40/12* (2013.01); *G06T 7/13* (2017.01); *G06T 7/30* (2017.01); *G06T 7/55* (2017.01); *B60W 2420/42* (2013.01); *B60W 2420/52* (2013.01)

(58) Field of Classification Search
CPC ...... G06V 20/58; B60W 40/10; B60W 40/12; B60W 2420/42; B60W 2420/52; G06T 7/13; G06T 7/30; G06T 7/55
See application file for complete search history.

(56) References Cited

U.S. PATENT DOCUMENTS

| | | | |
|---|---|---|---|
| 10,176,596 B1 * | 1/2019 | Mou | G06V 10/44 |
| 10,185,322 B1 * | 1/2019 | Desjarlais | G05D 1/0214 |
| 10,468,062 B1 * | 11/2019 | Levinson | G06N 20/00 |
| 10,580,158 B1 * | 3/2020 | Mousavian | G06T 7/50 |
| 10,620,637 B2 * | 4/2020 | Lingg | G06V 30/19147 |

(Continued)

FOREIGN PATENT DOCUMENTS

| | | | | |
|---|---|---|---|---|
| WO | WO-2010026268 A1 * | 3/2010 | | G01C 11/02 |
| WO | WO-2018126083 A1 * | 7/2018 | | B60W 40/06 |

*Primary Examiner* — Charles T Shedrick
(74) *Attorney, Agent, or Firm* — Lorenz & Kopf LLP

(57) ABSTRACT

Systems and methods for generating alignment parameters for processing data associated with a vehicle. In one embodiment, a method includes: receiving image data associated with an environment of the vehicle; receiving lidar data associated with the environment of the vehicle; processing, by a processor, the image data to determine data points associated with at least one vehicle identified within image data; processing, by the processor, the lidar data to determine data points associated with at least one vehicle identified within the lidar data; selectively storing the data points in a data buffer based on at least one condition associated with a quality of the data points; processing, by the processor, the data points in the data buffer with a joint analysis method to generate alignment parameters between the lidar and the camera; and processing future data based on the alignment parameters.

20 Claims, 3 Drawing Sheets

(56) References Cited

U.S. PATENT DOCUMENTS

| | | | | |
|---|---|---|---|---|
| 10,650,278 | B1* | 5/2020 | Ho | G06V 10/26 |
| 11,210,801 | B1* | 12/2021 | Zhang | G06V 10/811 |
| 2016/0026184 | A1* | 1/2016 | Stainvas Olshansky | |
| | | | | G05D 1/024 |
| | | | | 356/4.01 |
| 2016/0116593 | A1* | 4/2016 | Kim | G01S 17/931 |
| | | | | 356/5.01 |
| 2017/0242442 | A1* | 8/2017 | Minster | G06T 7/38 |
| 2017/0371348 | A1* | 12/2017 | Mou | G06V 20/56 |
| 2018/0157920 | A1* | 6/2018 | Hu | G01S 17/89 |
| 2018/0307238 | A1* | 10/2018 | Wisniowski | G05D 1/0246 |
| 2019/0011927 | A1* | 1/2019 | Mou | G06V 20/56 |
| 2019/0120948 | A1* | 4/2019 | Yang | G01S 7/4972 |
| 2019/0147253 | A1* | 5/2019 | Bai | G06F 18/2413 |
| | | | | 382/103 |
| 2019/0147254 | A1* | 5/2019 | Bai | G01S 17/89 |
| | | | | 382/104 |
| 2019/0156485 | A1* | 5/2019 | Pfeiffer | G05D 1/0253 |
| 2019/0163989 | A1* | 5/2019 | Guo | G06F 18/251 |
| 2019/0179320 | A1* | 6/2019 | Pacala | G05D 1/0214 |
| 2019/0311546 | A1* | 10/2019 | Tay | G05D 1/0088 |
| 2019/0340775 | A1* | 11/2019 | Lee | G06T 7/11 |
| 2019/0346844 | A1* | 11/2019 | Chen | G05D 1/0088 |
| 2019/0384302 | A1* | 12/2019 | Silva | G06T 7/10 |
| 2019/0384309 | A1* | 12/2019 | Silva | G01S 17/931 |
| 2020/0025935 | A1* | 1/2020 | Liang | G06V 20/64 |
| 2020/0090074 | A1* | 3/2020 | Isele | G06F 30/20 |
| 2020/0122178 | A1* | 4/2020 | Logan | B24B 27/0076 |
| 2020/0150654 | A1* | 5/2020 | Isele | G05D 1/0088 |
| 2021/0287035 | A1* | 9/2021 | Deegan | G06V 10/82 |
| 2022/0204029 | A1* | 6/2022 | Chen | G06T 7/74 |
| 2022/0206162 | A1* | 6/2022 | Chen | B60W 30/0956 |
| 2023/0303113 | A1* | 9/2023 | Teo | B60W 60/001 |
| | | | | 701/23 |

* cited by examiner

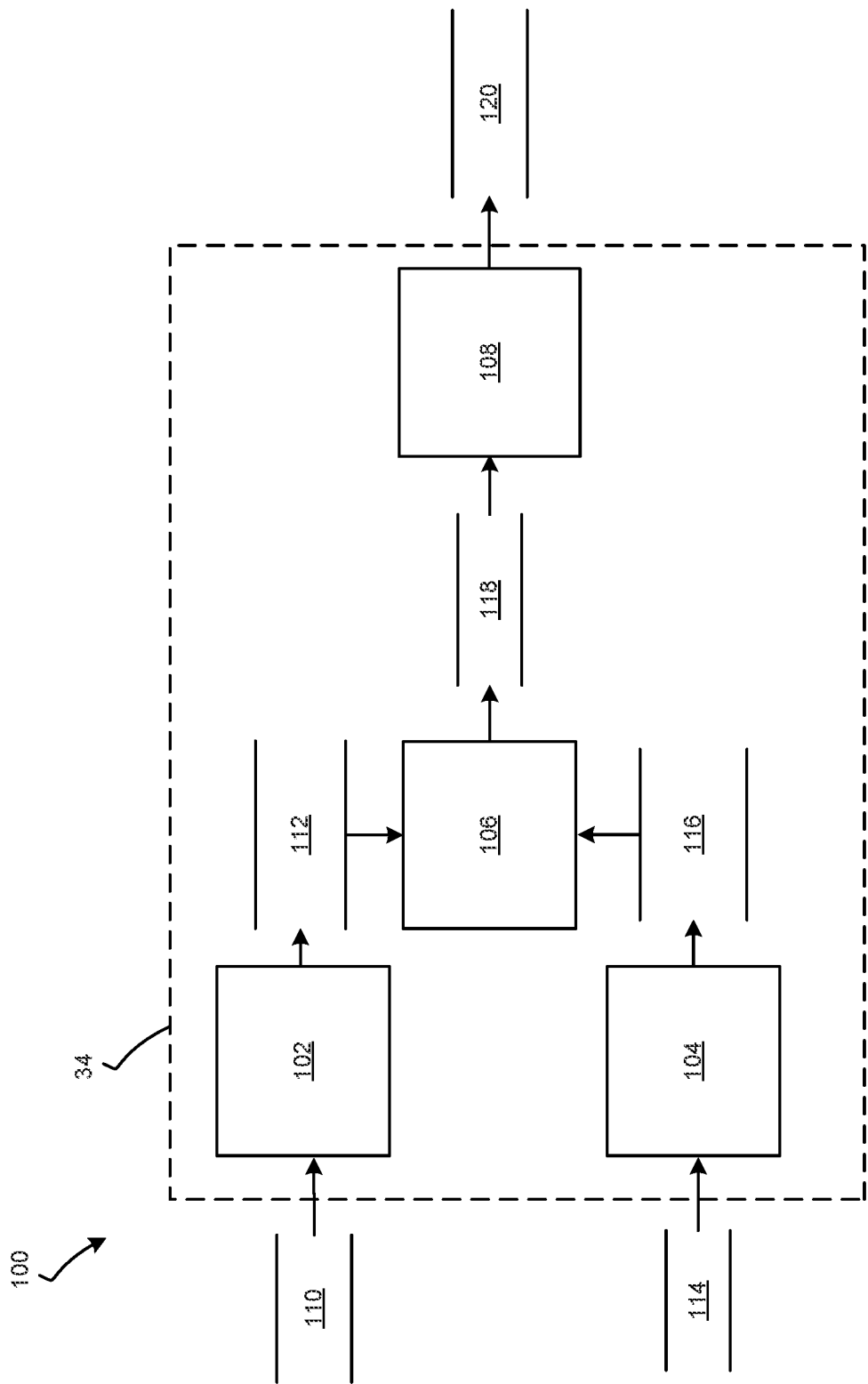

METHODS AND SYSTEMS FOR TWO-PHASE CAMERA TO LIDAR ALIGNMENT

TECHNICAL FIELD

The technical field generally relates to computer vision, and more particularly to methods and systems for determining camera to lidar alignment information for use in computer vision in a vehicle.

Modern vehicles are typically equipped with one or more optical cameras that are configured to provide image data that may be displayed to an occupant of the vehicle and that may be used for determining elements of the environment of the vehicle. The image data may show a virtual scene of the vehicle's surroundings. The virtual scene may be generated based on data from one or more cameras and data from one or more other sensors such as lidar or radar. For example, the image data are taken from different image sources that are located at different positions about the vehicle or from a single source that rotates with respect to the vehicle. The image data is evaluated and merged into a single perspective, such as a birds-eye-view perspective, based on alignment information. Methods to determine alignment information can be computationally intensive, especially if performed in real-time.

Accordingly, it is desirable to provide improved systems and methods for determining camera to lidar alignment information. Furthermore, other desirable features and characteristics of the present invention will become apparent from the subsequent detailed description and the appended claims, taken in conjunction with the accompanying drawings and the foregoing technical field and background

SUMMARY

Systems and methods for generating alignment parameters for processing data associated with a vehicle. In one embodiment, a method includes: receiving image data associated with an environment of the vehicle; receiving lidar data associated with the environment of the vehicle; processing, by a processor, the image data to determine data points associated with at least one vehicle identified within the image data; processing, by the processor, the lidar data to determine data points associated with at least one vehicle identified within the lidar data; selectively storing the data points in a data buffer based on at least one condition associated with a quality of the data points; processing, by the processor, the data points in the data buffer with a joint analysis method to generate alignment parameters between the lidar and the camera; and processing future data based on the alignment parameters.

In various embodiments, the processing the image data includes: processing the image data with a machine learning method to identify edges and contours of vehicles within the image; and applying an inverse distance transformation on the edges and contours.

In various embodiments, the processing the lidar data includes: applying a clustering method to detect objects within the scene; removing objects based on a filtering method; projecting the vehicle data into a coordinate system associated with the image data; and applying a convex hull method to the projected vehicle data to identify data points associated with edges of the vehicle.

In various embodiments, the condition is associated with a maneuver of the vehicle.

In various embodiments, the condition is associated with a number of the data points.

In various embodiments, the condition is associated with a distribution of the data points between a left side and a right side of the image of the image data.

In various embodiments, the condition is associated with a road structure similarly index measure between a first image and a second image of the image data.

In various embodiments, the condition is associated with a number of vehicles in the image of the image data.

In various embodiments, the condition is associated with a vehicle to image ratio.

In various embodiments, the joint analysis method includes: generating a plurality of three-dimensional cube spaces having a plurality of random perturbed points; evaluating the data point pairs for each perturbed point in each of the three-dimensional cube spaces to determine a score; and selecting a transformation matrix associated with a score that is greater than a threshold, wherein the alignment parameters are determined from the transformation matrix.

In another embodiment, a computer implemented system for generating alignment parameters for processing data associated with a vehicle is provided. The system includes: a data storage element comprising computer readable instructions; and a processor configured to execute the computer readable instructions, the computer readable instructions controlling the processor to perform operations comprising: receiving image data associated with an environment of the vehicle; receiving lidar data associated with the environment of the vehicle; processing the image data to determine data points associated with at least one vehicle identified within the image data; processing the lidar data to determine data points associated with at least one vehicle identified within the lidar data; selectively storing the data points in a data buffer based on at least one condition associated with a quality of the data points; processing the data points in the data buffer with a joint analysis method to generate alignment parameters between the lidar and the camera; and processing future data based on the alignment parameters.

In various embodiments, the processing the image data includes: processing the image data with a machine learning method to identify edges and contours of vehicles within the image; and applying an inverse distance transformation on the edges and contours.

In various embodiments, the processing the lidar data includes: applying a clustering method to detect objects within the scene; removing objects based on a filtering method; projecting the vehicle data into a coordinate system associated with the image data; and applying a convex hull method to the projected vehicle data to identify data points associated with edges of the vehicle.

In various embodiments, the condition is associated with a maneuver of the vehicle.

In various embodiments, the condition is associated with a number of the data points.

In various embodiments, the condition is associated with a distribution of the data points between a left side and a right side of the image of the image data.

In various embodiments, the condition is associated with a road structure similarly index measure between a first image and a second image of the image data.

In various embodiments, the condition is associated with a number of vehicles in the image of the image data.

In various embodiments, the condition is associated with a vehicle to image ratio.

In various embodiments, the joint analysis method includes: generating a plurality of three-dimensional cube spaces having a plurality of random perturbed points; evaluating the data point pairs for each perturbed point in each of the three-dimensional cube spaces to determine a score; and selecting a transformation matrix associated with a score that is greater than a threshold, wherein the alignment parameters are determined from the transformation matrix.

BRIEF DESCRIPTION OF THE DRAWINGS

The exemplary embodiments will hereinafter be described in conjunction with the following drawing figures, wherein like numerals denote like elements, and wherein:

FIG. 2 is dataflow diagram illustrating the controller of the vehicle in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
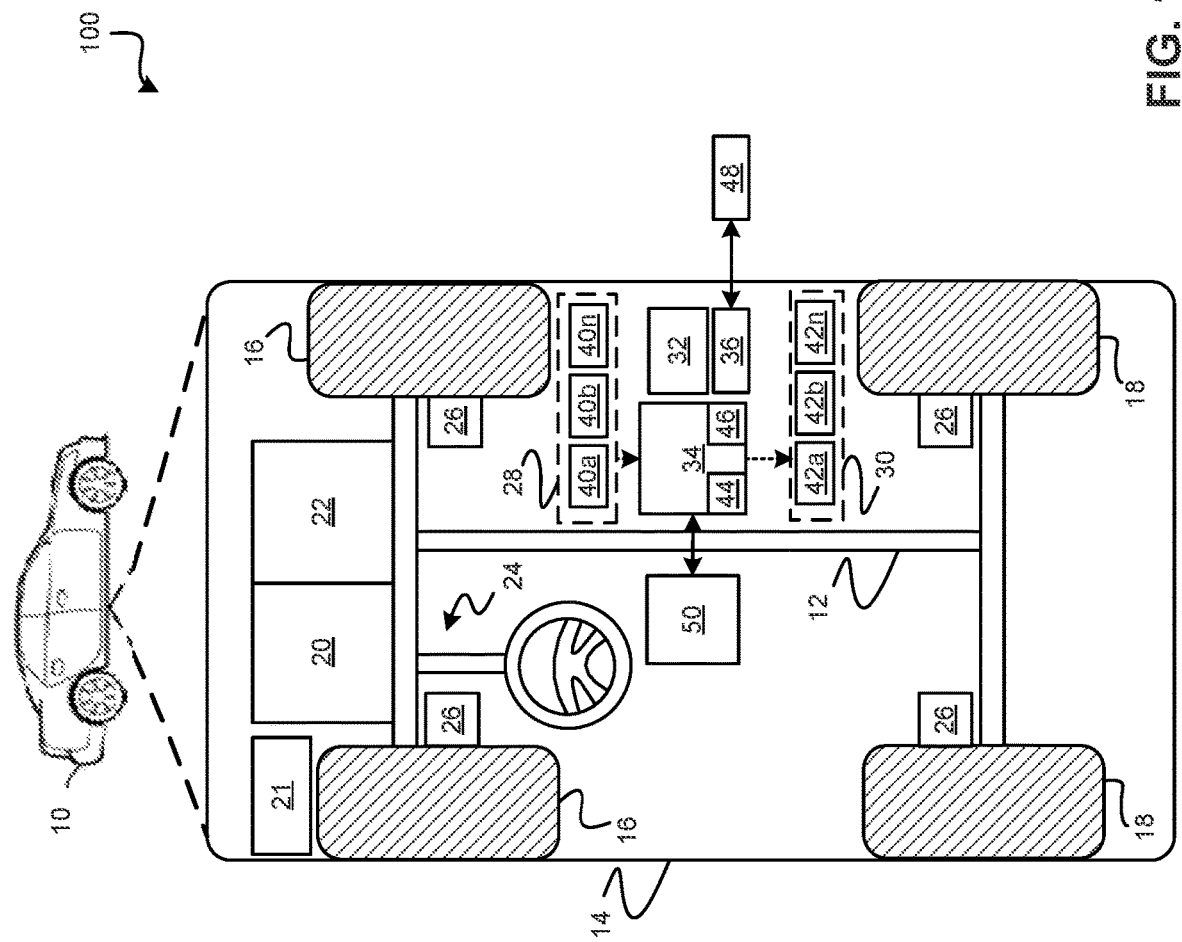
FIG. 1 is a schematic illustration of a vehicle with a controller implementing functions for generating alignment information in accordance with various embodiments.

With reference to FIG. 1, a vehicle 10 is shown having a system 100 in accordance with various embodiments. Generally, the system 100 determines alignment information between different data sources of the vehicle. The alignment information can be used, for example, in processing and/or generating image data from the multiple data sources. The generated image data may be used, for example, to display a surround view of the vehicle's environment on a display 50 of the vehicle 10. As can be appreciated, the alignment data can be used for other purposes including, but not limited to controlling the vehicle, and is not limited to the display example.

As shown in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating alignment information in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, a fuel cell propulsion system, and/or a combination thereof. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, a manual transmission, or any other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. The sensing devices 40a-40n are further configured to sense observable conditions of the vehicle 10. The sensing devices 40a-40n can include, but are not limited to, speed sensors, position sensors, inertial measurement sensors, temperature sensors, pressure sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the system 100 and, when executed by the processor 44, process image data from at least one optical camera of the sensor system 28 and image data from at least one lidar of the sensor system 28 to extract data pairs. The instructions, when executed by the processor 44, use the data pairs to determine camera to lidar alignment information. The camera alignment information is then used to assemble image data for display or other purposes within the vehicle 10.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

With reference to FIG. 2, and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the modules of the system 100 are implemented to enable a two phase approach to producing camera to lidar alignment information. For example, the modules of a first phase include an image data processing module 102, a lidar data processing module 104, and a data pair selection module 106. The image data processing module 102 processes image data 110 to produce vehicle point data 112. The image data 110 includes a two-dimensional points sensed from the environment and generated by the camera. The lidar data processing module 104 processes lidar data to produce vehicle point data 116. The lidar data 114 includes a three-dimensional point cloud sensed from the environment and generated by the lidar. The data pair selection module 106 processes the vehicle point data 112, 116 to selectively store quality data pairs in a data buffer 118.

In another example, the modules of the second phase include an alignment determination module 108. The alignment determination module 108 processes the data pairs from the data buffer 118 using a joint analysis method to determine alignment data 120 that defines alignment information between the camera and the lidar.

Figure 4:
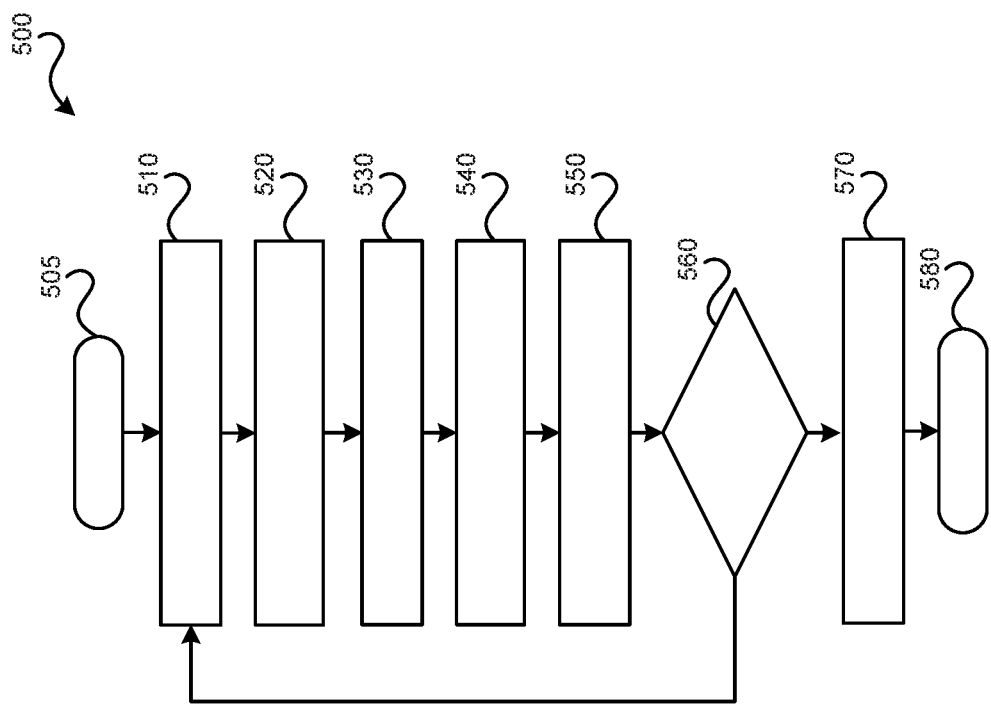
FIGS. 3 and 4 are flowcharts illustrating methods performed by the vehicle and the controller in accordance with various embodiments.
Figure 3:
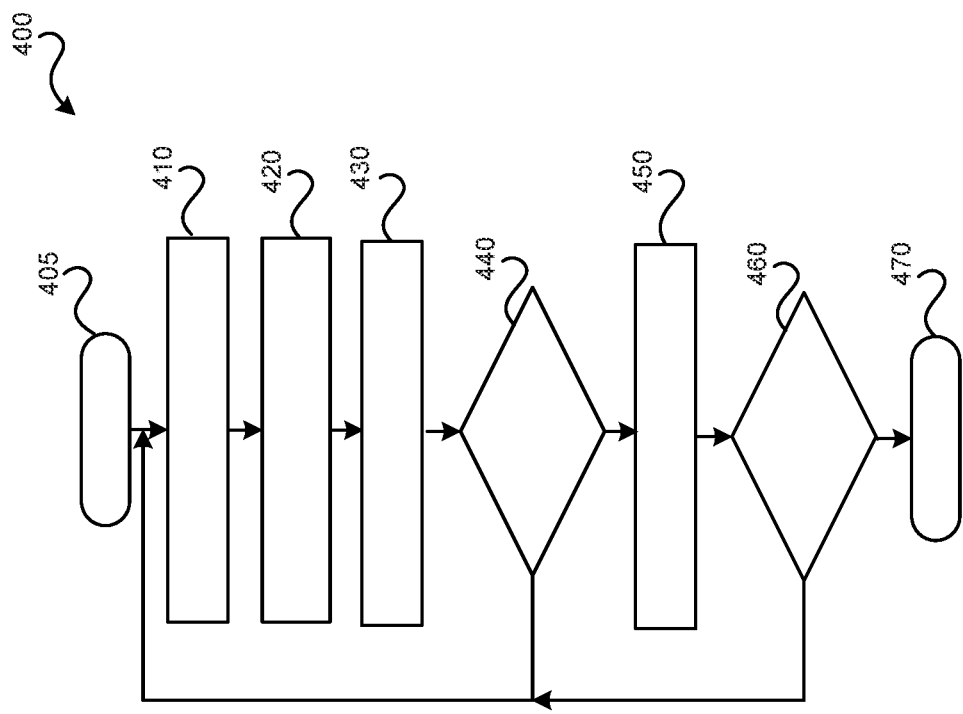

With reference to FIGS. 3 and 4 and with continued reference to FIGS. 1-2, flowcharts are provided of methods 400, 500 for performing the two phase approach to determining lidar to camera alignment as performed by the system 100 of FIGS. 1 and 2. In various embodiments, method 400 is associated with the first phase, and method 500 is associated with the second phase. Generally, the method 400 is executed before the method 500. As can be appreciated in light of the disclosure, the order of operations within the methods 400, 500 is not limited to the sequential execution as illustrated in FIGS. 3 and 4, but may be performed in one or more varying orders as applicable and in accordance with the present disclosure. In various embodiments, the methods 400 and 500 can be scheduled to run based on one or more predetermined events, and/or can run continuously during operation of the vehicle 10.

With particular reference to FIG. 3, in one example, the method 400 may begin at 405. At 410, the image data 110 is processed to identify the vehicle point data 112. For example, the image data 110 is processed to identify points associated with edges and contours of vehicles within the image using a deep learning neural network or other machine learning method; and an inverse distance transformation is performed on the edge data and the contour data to define a distance map of the identified points.

At 420, the lidar data 114 is processed to determine the vehicle point data 116. For example, the lidar data 114 is processed to identify outermost points of the vehicles within the three-dimensional point cloud using a clustering method and/or filtering methods (e.g., geometrical filtering methods based on known geometry of vehicles). The lidar data processing module 104 then projects the lidar points associated with the identified objects into the two dimensional camera coordinate system and processes the projected points using a convex hull method to find the outermost contour points that represent the vehicle edges.

Once the vehicle point data 112, 116 are determined, condition values associated with quality of the data points are determined at 430 and evaluated at 440. As can be appreciated, quality of the data pairs can be determined based on any number of conditions. In various embodiments, the conditions can be based on vehicle maneuvers, a number of edge points, a number of detected vehicles, symmetry in the image, Road Structural Similarity index measures (or Road-SSIM), and Vehicle Image Ratio (VIR) measures. For example, vehicles making sharp turn maneuvers can amplify small synchronization differences between lidar and camera causing bad alignment. Thus, a condition for monitoring quality can include when the yaw rate of the vehicle is greater than a threshold (e.g., five degrees per second).

In another example, the number of edge points in the lidar image at a certain distance can indicate quality. Thus, a condition for quality can include when the number of edge points in the lidar data is less than a threshold at a defined distance (e.g., 200 points at 30 meters). In another example, a distribution of the edge points between the left side and the right side of the image can indicate quality. Thus, a condition for quality can include when the distribution between the left side and the right side is somewhat equal.

In another example, a number of vehicles within the image can indicate quality. Thus, a condition for quality can include when the number of vehicles identified within the image is less than a threshold number of vehicles (e.g., two vehicles). In another example, the Road-SSIM is used to detect if the given input image x is similar to any of the images y in the buffer (previously accepted data pairs). This is useful to avoid storing redundant data pairs for image frames accumulated when the vehicle 10 is stopped. Thus, a condition for quality can include when the Road-SSIM is greater than a threshold (e.g., 0.7)

In another example, the VIR can indicate a quantitative measure of existing vehicles in the FOV of the camera. Thus, a condition for quality can include when the VIR is less than a threshold (e.g., 0.1).

At 440, if any of these conditions are false, then the data pair is excluded from the data buffer 118 and processing continues at 410. If all of these conditions are true at 440, the data pair is saved into the data buffer 118 at 450. Once the data buffer 118 has sufficient data at 460, the data collection process of the first phase is complete and the method 400 may and at 470.

With particular reference to FIG. 4, in one example, the method 500 may begin at 505. At 510, three dimensional cubes are generated containing random possible perturbed points in the rotational 3D space. Each cube is associated with a search level (e.g., search level one, search level two, search level three, and search level four). The search levels each have a different possible search space to allow for convergence. The points within the cubes are uniformly random.

At 520, the first cube with the search level 1 and having perturbations as large as three degrees in the rotational search space evaluates the input data pair to see if alignment can be improved and generates a score. The score is generated by evaluating the correlation of the projected lidar contour points onto the distance map of the image. Each cube generates 500 possible scores using the 500 uniformly random points representing rotational perturbations. Usually, the highest score corresponds to the best perturbation adjustment. The same level one is repeated three times to guarantee a stable convergence.

The same process is repeated for the remaining search cubes at 530, 540, and 550 having different search levels. If the final score does not exceed the threshold at 560, the analysis is repeated at 510. The final score is evaluated at 560. If the final score exceeds a threshold at 560, the transformation matrix is stored for future use at 570. The transformation matrix is then used to define the alignment data 120. Thereafter, the method 500 may end at 580.

As can be appreciated, computational resources necessary for aligning a camera with a lidar is thus improved by the methods and systems described herein, and accordingly, the claimed embodiments effectuate an improvement in the technical field of computer vision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating alignment parameters for processing data associated with a vehicle, the method comprising:
   receiving image data associated with an environment of the vehicle;
   receiving lidar data associated with the environment of the vehicle;
   processing, by a processor, the image data to determine data points associated with at least one vehicle identified within the image data;
   processing, by the processor, the lidar data to determine data points associated with at least one vehicle identified within the lidar data;
   selectively storing the data points in a data buffer based on at least one condition associated with a quality of the data points;
   processing, by the processor, the data points in the data buffer with a joint analysis method to generate alignment parameters between the lidar and the camera; and
   processing future data based on the alignment parameters.

2. The method of claim 1, wherein the processing the image data comprises:
   processing the image data with a machine learning method to identify edges and contours of vehicles within the image; and
   applying an inverse distance transformation on the edges and contours.

3. The method of claim 1, wherein the processing the lidar data comprises:
   applying a clustering method to detect objects within the scene;
   removing objects based on a filtering method;
   projecting the vehicle data into a coordinate system associated with the image data; and
   applying a convex hull method to the projected vehicle data to identify data points associated with edges of the vehicle.

4. The method of claim 1, wherein the condition is associated with a maneuver of the vehicle.

5. The method of claim 1, wherein the condition is associated with a number of the data points.

6. The method of claim 1, wherein the condition is associated with a distribution of the data points between a left side and a right side of the image of the image data.

7. The method of claim 1, wherein the condition is associated with a road structure similarly index measure between a first image and a second image of the image data.

8. The method of claim 1, wherein the condition is associated with a number of vehicles in the image of the image data.

9. The method of claim 1, wherein the condition is associated with a vehicle to image ratio.

10. The method of claim 1, wherein the joint analysis method comprises:
    generating a plurality of three-dimensional cube spaces having a plurality of random perturbed points;
    evaluating the data point pairs for each perturbed point in each of the three-dimensional cube spaces to determine a score; and
    selecting a transformation matrix associated with a score that is greater than a threshold, wherein the alignment parameters are determined from the transformation matrix.

11. A computer implemented system for generating alignment parameters for processing data associated with a vehicle, the system comprising:
    a data storage element comprising computer readable instructions; and
    a processor configured to execute the computer readable instructions, the computer readable instructions controlling the processor to perform operations comprising:
    receiving image data associated with an environment of the vehicle;
    receiving lidar data associated with the environment of the vehicle;
    processing the image data to determine data points associated with at least one vehicle identified within the image data;
    processing the lidar data to determine data points associated with at least one vehicle identified within the lidar data;
    selectively storing the data points in a data buffer based on at least one condition associated with a quality of the data points;
    processing the data points in the data buffer with a joint analysis method to generate alignment parameters between the lidar and the camera; and
    processing future data based on the alignment parameters.

12. The system of claim 11, wherein the processing the image data comprises:

processing the image data with a machine learning method to identify edges and contours of vehicles within the image; and applying an inverse distance transformation on the edges and contours.

13. The system of claim 11, wherein the processing the lidar data comprises:

applying a clustering method to detect objects within the scene;

removing objects based on a filtering method;

projecting the vehicle data into a coordinate system associated with the image data; and applying a convex hull method to the projected vehicle data to identify data points associated with edges of the vehicle.

14. The system of claim 11, wherein the condition is associated with a maneuver of the vehicle.

15. The system of claim 11, wherein the condition is associated with a number of the data points.

16. The system of claim 11, wherein the condition is associated with a distribution of the data points between a left side and a right side of the image of the image data.

17. The system of claim 11, wherein the condition is associated with a road structure similarly index measure between a first image and a second image of the image data.

18. The system of claim 11, wherein the condition is associated with a number of vehicles in the image of the image data.

19. The system of claim 11, wherein the condition is associated with a vehicle to image ratio.

20. The system of claim 11, wherein the joint analysis method comprises:

generating a plurality of three-dimensional cube spaces having a plurality of random perturbed points;

evaluating the data point pairs for each perturbed point in each of the three-dimensional cube spaces to determine a score; and selecting a transformation matrix associated with a score that is greater than a threshold, wherein the alignment parameters are determined from the transformation matrix.

* * * * *